April 4, 1967   L. C. FLOWERS ETAL   3,312,851
ELECTROLUMINESCENT LAMP STRUCTURE HAVING THE
PHOSPHOR PARTICLES DISPERSED IN A MODIFIED
CYANOETHYLATED POLYVINYL ALCOHOL RESIN
Filed April 26, 1963
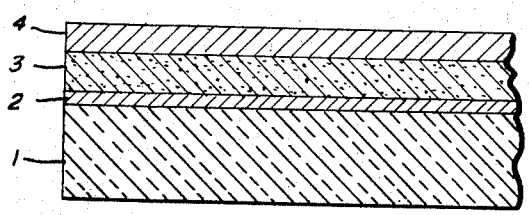
INVENTORS
*LEONARD C. FLOWERS*
*& DAVID MARSCHIK*
H. L. Towle
ATTORNEY ![United States Patent Office]

3,312,851
ELECTROLUMINESCENT LAMP STRUCTURE HAVING THE PHOSPHOR PARTICLES DISPERSED IN A MODIFIED CYANOETHYLATED POLYVINYL ALCOHOL RESIN
Leonard C. Flowers, Franklin Township, Westmoreland County, and David Marschik, Wilkinsburg, Pa., assignors to Westinghouse Electric Corporation, Pittsburgh, Pa., a corporation of Pennsylvania
Filed Apr. 26, 1963, Ser. No. 276,012
5 Claims. (Cl. 313—108)

This invention relates to a method of curing a cyanoethylated polyvinyl alcohol. This invention further relates to a modified cyanoethylated polyvinyl alcohol which possesses a high dielectric constant and to the use of said modified cyanoethylated polyvinyl alcohol in phosphor-dielectric layers and in the electrical insulating layers of electroluminescent lamps.

Electroluminescent devices are well known in the art. Such a device may comprise a transparent base, such as a sheet of glass; a transparent electrically-conductive layer thereon, such as tin oxide, which serves as one electrode; a layer of an electroluminescent material i.e., a material which emits light when an electric field of sufficient magnitude, is applied to it; and a layer of a metallic material, such as aluminum, which serves as another electrode. When a voltage source is connected to the two electrodes to produce an electric field across the electroluminescent layer, an electroluminescent emission occurs.

The electroluminescent material may comprise an admixture of a phosphor compound and a dielectric material. The purpose of the admixed dielectric material is to prevent any electrical breakdown between the cell electrodes and also to enable much higher electric fields to be placed across the phosphor to increase its efficiency for the generation of light as well as to increase the light output intensity which can be realized.

In electroluminescent devices, synthetic resins, such as a copolymer of vinyl acetate and vinyl chloride, are frequently used as a dielectric material to embed the phosphor particles. Thus, such a device may be constructed by dissolving the resin in a suitable solvent, suspending a predetermined amount of phosphor material in the solution and painting, spraying, casting or otherwise coating the mixture onto an electrically conducting glass surface which functions as a transparent electrode. The coated glass is then dried and an aluminum or other conducting coating is vacuum deposited over the surface of the resin-phosphor layer to form a second electrode. The resin serves as an electrical insulation for the phosphor particles and also acts as a matrix which holds the particles in their original uniformly distributed positions.

The light output from an electroluminescent lamp varies considerably with the particular type of resinous dielectric material used as the matrix for the phosphor particles. This variation is not wholly dependent upon the dielectric constant of the particular resinous dielectric but depends also upon other factors such as the ability of the resinous dielectric to adhere to the electrically conducting glass.

In order to obtain high brightness, the total voltage gradient in the phosphor-dielectric layer must be steep. Therefore, the phosphor-dielectric layer must not be too thick. A range of thickness of from about 0.001 to 0.002 inch is common. Such thin layers of phosphor particles embedded in the dielectric resin may not withstand applied voltages as high as desired for some service applications. Therefore, it is a common practice to superimpose one or more clear coats of the resin itself (which does not contain any phosphor material) over the phosphor-dielectric layer. The clear coats of resin are generally applied from solution. A disadvantage of this process is that the solvent employed in applying the clear resin coating is one which will naturally tend to soften and redissolve the resin in which is embedded the phosphor particles. Therefore, the phosphor-dielectric layer may be penetrated and partially dissolved by the solvents with an accompanying disturbance of phosphor distribution. This results in an erratic and excessive loss of brightness at low voltage without a commensurate increase in breakdown voltage.

It has been found that for any given phosphor, the brightness of electroluminescent lamps is increased by the use of cyanoethylated polyvinyl alcohol as the embedding resin for the phosphor. However, in some applications, the use of cyanoethylated polyvinyl alcohol is subject to certain disadvantages. For example, when a clear coat of this resin itself is applied from a solution of the resin over the phosphor-dielectric layer as described above, the matrix of cyanoethylated polyvinyl alcohol may tend to redissolve. Moreover, cyanoethylated polyvinyl alcohol is susceptible to cold flow under pressure which is undesirable in some constructions, such as, for example, when spring-loaded electrical contacts are employed.

It is an object of this invention to provide a resin composition which is not subject to attack by organic solvents.

It is another object of this invention to provide a resin composition which, when used as an embedding resin for any given phosphor material in an electroluminescent lamp, results in increased brightness and is not subject to cold flow.

It is a further object of this invention to provide an electroluminescent device of increased brightness and durability.

The foregoing objects are accomplished by the practice of this invention which, briefly, comprises providing a composition comprising a cyanoethylated polyvinyl alcohol and from about 0.6 to about 40.0% and preferably less than about 3.0%, based on the weight of the cyanoethylated polyvinyl alcohol of an organic compound having at least two-NCX groups in which X is a member selected from the group consisting of oxygen and sulfur. The composition is used as an embedding material for a phosphor-bearing layer which is disposed between an electrically conductive layer and a light transmitting electrically conductive layer in an electroluminescent device.

The aspects of this invention which are capable of illustration are shown in the accompanying drawing which is a cross-sectional view of an electroluminescent lamp structure.

As illustrated in the drawing there is provided a transparent base member 1 and a transparent electrically conducting layer 2 thereon. A layer 3 of an electroluminescent material, which comprises a phosphor embedded in a dielectric composition comprising a cyanoethylated polyvinyl alcohol and from about 0.6 to about 40% based on the weight of the cyanoethylated polyvinyl alcohol of an organic compound having at least two-NCX groups, in which X is as defined above, is disposed between the light transmitting electrically conductive layer 2 and another electrically conductive layer 4.

The transparent base member 1 may be, for example, a sheet of glass. The electrically conductive layer 2 which is disposed on the transparent base member 1 may be tin oxide, or other electrically conductive material. Such a layer may be applied to the base member in any convenient manner. An example of one method includes the steps of first applying a coating comprising an aqueous solution of tin chloride to the surface of the glass layer 1. This coating then is dried in a baking oven of suitable design whereupon a semiconductive layer of oxide is formed. This layer comprises tin oxide in the mixed valent state of $SnO$ and $SnO_2$. The transparent base member 1 may also comprise a sheet of a resinous material such as, for example, cyanoethylated polyvinyl alcohol in which may be incorporated a polyisocyanate or a polyisothiocyanate. A conductive coating such as aluminum, silver, gold copper etc., may be applied thereto by vacuum metallizing the metal in a layer having the thickness of the order of about 0.00025 ml. or less, down to 96 to 24 Angstroms. If the transparent base member 1 comprises a layer of thermoplastic material, a flexible electroluminescent lamp structure is obtained.

The organic compounds having at least two-NCX groups which may be used in the dielectric embedding material for the phosphor in the layer 3 are those polyisocyanates and polyisothiocyanates which are well known in the art. Examples of such compounds include 2,4-tolylene diisocyanate, 2,6-tolylene diisocyanate, 3,3'-bitolylene, 4,4'-diisocyanate, hexamethylene diisocyanate, 4,4',4''-triphenylemethane triisocyanate, 4,4'-diphenylmethane diisocyanate, 2,4-tolylene diisothiocyanate, polymethylene polyphenyl polyisocyanate (a compound having the formula

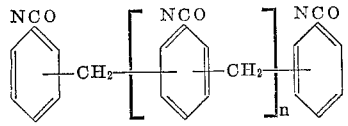

in which $n$ is a whole number), etc. Further examples of polyisocyanates and polyisothiocyanates which may be used in the practice of this invention are disclosed in U.S. Patents 3,020,249; 3,054,756; and 3,061,557, and in Australian Patents 205,456; 221,411; and 230,401, the disclosures of which are incorporated herein by reference.

The cyanoethylated polyvinyl alcohol used in the dielectric embedding material in the layer 3 may be obtained by reacting polyvinyl alcohol with vinyl cyanide in the presence of an alkali as described in U.S. Patent No. 2,341,553, the disclosure of which is incorporated herein by reference. Preferably, the procedure described in that patent is modified by adding to the reaction medium ammonium hydroxide. This procedure increases the rate of cyanoethylation and minimizes discoloration in the final product. The amount of ammonium hydroxide used is not critical and may vary generally between about 0.1 to about 10% by weight of the acrylonitrile. A small amount of an alkaline catalyst is employed. For example, solutions containing 0.5 to 20% by weight of alkali metal hydroxide are suitable. An excess of acrylonitrile is preferably employed as a solvent for hte product produced by the cyanoethylation of the polyvinyl alcohol. Other solvent materials may be added or employed as, for example, acetone; a low molecular weight fatty acid ester, such as methyl acetate; or a polyether, for example, dioxane.

Cyanoethylated polyvinyl alcohol is characterized by the presence of a plurality of beta cyanoethyl groups in the molecule. Thus, cyanoethylated polyvinyl alcohol contains a plurality of groups having the formula

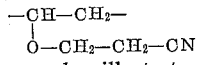

The following examples illustrate the preparation of cyanoethylated polyvinyl alcohol which is used in the preferred embodiments of this invention:

*Example I*

A mixture of 13.5 parts by weight of granulated polyvinyl alcohol (having a viscosity of 4–6 centipoises as a 4% water solution at 20° C.) and 240 parts by weight of acrylonitrile is stirred while 0.9 part by weight of a 29% ammonium hydroxide solution is added, followed immediately by 3 parts by weight of 1% sodium hydroxide solution and 3 parts of weight of 5% sodium hyroxide solution. The mixture is then heated to reflux, and refluxed with stirring.

*Example II*

A mixture of 13.5 parts by weight of granulated polyvinyl alcohol (having a viscosity of 4–6 centipoises as a 4% water solution at 20° C.) and 240 parts by weight of acrylonitrile is stirred while 2.7 parts by weight of a 29% ammonium hydroxide solution is added, followed immediately by 3 parts by weight of 1% sodium hydroxide solution and 3 parts by weight of 5% sodium hydroxide solution. The mixture is then heated to reflux, and refluxed with stirring.

*Example III*

A mixture of 13.5 parts by weight of granulated polyvinyl alcohol (having a viscosity of 4–6 centipoises as a 4% water solution of 20° C.) and 240 parts by weight of acrylonitrile is stirred while 8.1 parts by weight of a 29% ammonium hydroxide solution is added, followed immediately by 3 parts by weight of 1% sodium hydroxide solution and 3 parts by weight of 5% sodium hydroxide solution. The mixture is then heated to reflux and refluxed with stirring.

*Example IV*

A mixture of 2400 parts by weight of acrylonitrile and 270 parts by weight of granulated polyvinyl alcohol (having a viscosity of 28–32 centipoises as a 4% water solution at 20° C.) is stirred while 180 parts by weight of 29% ammonium hydroxide is slowly added. A curdy white precipitate forms. Fifty parts by weight of 3% sodium hydroxide solution is then added and the mixture is heated to reflux with continued stirring. After 38 minutes of reflux, a clear colorless solution is obtained with lumps of the original precipitate suspended in it. A light yellow color develops in about 100 minutes and a slight turbidity in about 150 minutes. At this point, the solution is cooled to room temperature, filtered and precipitated by pouring it into 50% ethanol. The gummy precipitate is washed with water, dissolved in acetone, precipitated by pouring into water, washed again with water, dissolved in acetone and recovered by evaporation of the acetone under vacuum. A tough white resin is obtained.

*Example V*

A mixture of 240 parts by weight of acrylonitrile and 27 parts by weight of a granulated polyvinyl alcohol (having a viscosity of 55–65 centipoises as a 4% water solution at 20° C.) is stirred while 9 parts by weight of 29% ammonium hydroxide is added, followed by 5 parts by weight of 3% sodium hydroxide. The mixture is heated to reflux and refluxed with stirring. It becomes clear and colorless after 30 minutes of reflux, although the original precipitate with ammonia remains undissolved. A pale yellow color begins to develop in 60 minutes, and it slowly deepens to orange in 210 minutes. A slight turbidity also develops in 210 minutes and increases during the next 30 minutes. The run is discontinued after 240 minutes. Samples are removed and worked up as described in the preparation of Example IV at various times during the run. They are tough, white-to-pale yellow resins up to 150 minutes of reflux.

The polyisocyanate or polyisothiocyanate compound is added to and mixed with the cyanoethylated polyvinyl alcohol which may be in the form of an organic solution. Suitable solvents include methyl ethyl ketone, dimethylformamide, acetone, pyridine, acetonitrile, etc.

The dielectric constant of the dielectric composition comprising the layer 3 may be increased by mixing with the composition finely divided barium titanate or barium strontium titanate.

The phosphor is added to and dispersed in the solution of cyanoethylated polyvinyl alcohol and polyisocyanate or polyisothiocyanate. The phosphor may comprise any of those phosphors which are well known in the art and may include, for example, those which are electric field responsive, i.e., those which will luminesce under the influence of an electric field such as, for example, a mixture of zinc oxide and zinc sulfide powders, zinc sulfide activated by copper, copper and lead, manganese, or copper and manganese. The proportion of phosphor used in preparing the devices of this invention may vary over a wide range. In general, the larger the amount of phosphors incorporated into a given thickness of the resin, the brighter will be the light produced. The upper limit for a given thickness of resin is dependent upon the particle size of the phosphors. Thus, the smaller the particle size the greater the amount that may be used. Particularly satisfactory results are obtained using a weight ratio of from two to three parts by weight of phosphor to one part by weight of the resin. This ratio may, of course, be extended to greater or lesser amounts depending upon the thickness of the layer of resin.

The composition containing the cyanoethylated polyvinyl alcohol, the polyisocyanate or polyisothiocyanate, and the phosphor is cast or sprayed as a thin film directly onto the electrically conductive layer 2. The film may be cured by baking at elevated temperatures i.e., at about 150° C. Subsequently, additional films of clear resin (i.e., cyanoethylated polyvinyl alcohol and polyisocyanate or polyisothiocyanate) may be cast on top of the phosphor-bearing layer 3.

The conducting layer 4 may comprise a layer of any conducting material such as, for example, aluminum, copper, silver or the like. This layer may be of any desired thickness ranging from a thin foil to a relatively thick sheet. It may be applied in the form of discrete particles applied as a molten spray. Alternatively, a sheet of metal foil 4 may be laid onto the free surface of the layer 3 by gluing hot pressing techniques. As another alternative, the phosphor bearing layer 3 may be spray coated onto a sheet of metal 4 and that sheet placed onto the glass 1 with the conductive layer 2 of the glass being in contact with the sprayed layer 3.

The thickness of the various layers forming the electroluminescent lamp structures of this invention may be altered to suit various voltage conditions. The layer which is glass may be of any thickness. Usually ⅛ inch thicknesses are preferred. The electrically conductive layer 2 should have a thickness of the order of from 0.0001 to 0.0025 to provide optimum light-transmitting properties. The phosphor-containing layer 3 may vary from 0.0005 to 0.01 inch or more in thickness. The layer 4 may be of a thickness of about 0.025 inch or greater.

In operation, a voltage, preferably alternating, is applied between conductive layers 1 and 4 through suitable conducting leads (not shown). The particular voltage used necessarily will depend upon the phosphor used, the thickness of the phosphor layer, and the brightness of the light intensity desired.

Lamps provided by the practice of this invention are at least twice as bright as those employing conventional dielectric resinous material such as, for example, a polyvinyl chloride-acetate copolymer. Moreover, the lamps of this invention dissipate less power as heat at high voltages than would be expected. Furthermore, films cast from a mixture of cyanoethylated alcohol and a polyisocyanate or a polyisothiocyanate are not subject to cold flow or to attack by organic solvents.

The following examples illustrate the best modes contemplated for carrying out this invention:

*Example VI*

A 25% solution of cyanoethylated polyvinyl alcohol in a solvent mixture comprising 66⅔% by weight of methyl ethyl ketone and 33⅓% by weight of dimethylformamide is prepared. There is then added 1% by weight of the cyanoethylated polyvinyl alcohol of 2,4-tolylene diisocyanate. A film is cast from the solution, the film is dried at room temperature until the volatile portion of the solvent is evaporated and the film is then baked for 30 minutes at 150° C. The film thickness after baking is approximately 0.002 inch. Subsequently, the film is immersed in acetone at room temperature for four days. It is determined that 79% by weight of the film remains undissolved at the end of this time thus indicating that the polyisocyanate addition has improved the resistance of the film to organic solvents.

*Example VII*

The process of Example VI is repeated with the sole exception that the 2,4-tolylene diisocyanate is replaced with an equal amount of an isomeric mixture consisting of 80% 2,4-tolylene diisocyanate and 20% 2,6-tolylene diisocyanate. After immersion in acetone at room temperature for four days, 81% by weight of the film remains undissolved.

*Example VIII*

The process of Example VI is repeated with the sole exception that the 2,4-tolylene diisocyanate is replaced with an equal amount of the product obtained by reacting one mol of trimethylol propane with three mols of an isomeric mixture consisting primarily of 2,4-tolylene diisocyanate and blocking the resulting product with cresol. After immersion in acetone at room temperature for four days, 95% by weight of the film remains undissolved.

For the purpose of comparison, the process of Example VI is repeated with the sole exception that the polyisocyanate is entirely omitted. The film completely dissolves after immersion in acetone at room temperature for only two minutes.

*Example IX*

A 5% by weight resin solution is prepared by dissolving 7.5 parts by weight of cyanoethylated polyvinyl alcohol (13.2% nitrogen) in a mixed solvent consisting of 47.5 parts by weight of dimethylformamide and 95.0 parts by weight of acetonitrile. One part by weight of Mondur S (obtained by reacting one mol of trimethylol propane with three mols of an isomeric mixture of tolylene diisocyanates and, thereafter blocking the resulting product with cresol) is dissolved in 19 parts by weight of dimethylformamide to form a polyisocyanate solution. The polyisocyanate solution (0.60 part by weight) is added to 23.4 parts by weight of the previously prepared cyanoethylated polyvinyl alcohol solution. The resultant mixture comprises 2.5% by weight of the polyisocyanate based on the weight of the cyanoethylated polyvinyl alcohol. A green emitting phosphor (3½ parts by weight) is suspended in this mixture and the resultant composition is sprayed in three successive coats onto an electrically conducting surface of a glass plate. Each of the first two coats is dried five minutes in an oven maintained at 150° C. The third coat is baked for 30 minutes in the oven. The plate is allowed to cool and is then coated with a clear mixture consisting of 0.13 part by weight of Mondur S solution (prepared as described above) and 5.0 parts by weight of cyanoethylated polyvinyl alcohol solution (prepared as described above). This mixture is applied to the plate in two coats by spraying. The first coat is dried for five minutes at 150° C. in an oven and the second coat is baked for 30 minutes at 150° C. in the oven. After the final clear coat has been applied to the plate, an electrode of vacuum metallized aluminum is applied over the clear coatings. Electrical connections are made between the aluminum electrode and the electrically conductive glass surface electrode. The apparatus is then connected through a variable transformer to a source of 60 c.p.s. alternating current and a current of 120 volts is applied. The lamp is approximately 40% brighter than a lamp made as described above but omitting the polyisocyanate.

We claim:

1. In an electroluminescent lamp structure comprising a phosphor-bearing layer disposed between two electrically conductive layers, the improvement which comprises having said phosphor embedded and dispersed in a layer of a dielectric material comprising a cyanoethylated polyvinyl alcohol modified with from about 0.6 to 40.0%, based on the weight of the cyanoethylated polyvinyl alcohol, of an organic material selected from the group consisting of polyisocyanates and polyisothiocyanates.

2. An electroluminescent lamp structure comprising in successive association a layer of electrically conductive, light-transmitting glass; a phosphor-bearing layer in which phosphors are embedded in a dielectric composition comprising cyanoethylated polyvinyl alcohol modified with from about 0.6 to 40.0% based on the weight of the cyanoethylated polyvinyl alcohol of an organic material selected from the group consisting of polyisocyanates and polyisothiocyanates; and an electrically conductive layer.

3. An electroluminescent lamp as defined in claim 2 wherein said organic material is a polyisocyanate and is present in the dielectric composition in an amount of less than 3.0% based on the weight of the cyanoethylated polyvinyl alcohol.

4. In an electroluminescent lamp structure having a resinous layer with phosphor particles dispersed therein, the improvement comprising having said phosphor particles dispersed in a resinous layer comprising a cyanoethylated polyvinyl alcohol modified with from about 0.6 to 40.0%, based on the weight of the cyanoethylated polyvinyl alcohol, of an organic material selected from the group consisting of polyisocyanates and polyisothiocyanates.

5. The lamp structure of claim 4 wherein a clear resinous coating is superimposed over said resinous layer.

References Cited by the Examiner
UNITED STATES PATENTS

| | | | |
|---|---|---|---|
| 2,341,553 | 2/1944 | Houtz | 260—91.3 |
| 2,593,829 | 4/1952 | Arledter et al. | 260—77.5 X |
| 2,648,717 | 8/1953 | Ross et al. | 260—77.5 X |
| 3,167,677 | 1/1965 | Fremuth | 313—108 |

JAMES W. LAWRENCE, *Primary Examiner.*

DAVID J. GALVIN, *Examiner.*

R. JUDD, *Assistant Examiner.*